United States Patent
Fields

[11] Patent Number: 5,981,632
[45] Date of Patent: Nov. 9, 1999

[54] OXIDIZED ASPHALT EMULSIONS

[76] Inventor: John R. Fields, 2626 120th E., Sumner, Wash. 98309

[21] Appl. No.: 09/168,181

[22] Filed: Oct. 7, 1998

[51] Int. Cl.[6] ...................................................... C08L 95/00
[52] U.S. Cl. ..................... 524/60; 106/164.4; 106/164.5; 106/164.6; 106/277; 524/59; 524/68
[58] Field of Search ................................ 529/59, 60, 68; 106/164.4, 164.5, 164.6, 277

[56] References Cited

U.S. PATENT DOCUMENTS

| | | | |
|---|---|---|---|
| 3,224,689 | 12/1965 | Behrens et al. | 241/256 |
| 3,297,668 | 1/1967 | Berg et al. | 528/488 |
| 4,349,590 | 9/1982 | Bolen et al. | 427/389.7 |
| 4,494,992 | 1/1985 | Schilling et al. | 106/277 |
| 4,692,350 | 9/1987 | Clarke et al. | 427/138 |
| 4,822,427 | 4/1989 | Graf et al. | 106/502 |
| 4,985,079 | 1/1991 | Graf et al. | 106/502 |
| 5,120,708 | 6/1992 | Melear et al. | 507/126 |
| 5,273,683 | 12/1993 | Krivohlavek | 252/351 |
| 5,333,804 | 8/1994 | Liebert | 241/69 |
| 5,336,438 | 8/1994 | Schilling et al. | 252/311.5 |
| 5,362,316 | 11/1994 | Paradise | 106/277 |
| 5,558,702 | 9/1996 | Chatterjee et al. | 106/277 |
| 5,658,972 | 8/1997 | Grzybowski et al. | 524/59 |
| 5,667,576 | 9/1997 | Chatterjee et al. | 106/277 |
| 5,674,313 | 10/1997 | Aoyama et al. | 106/2 |
| 5,711,796 | 1/1998 | Grzybowski et al. | 106/281.1 |

*Primary Examiner*—Peter A. Szekely
*Attorney, Agent, or Firm*—Garrison & Associates PS; Matthew J. Marguardt; David L. Garrison

[57] ABSTRACT

Product and method for making an asphaltic emulsion enjoying the weather-resistant and durability advantages of a fully-oxidized asphaltic base. Preferred compositions according to the invention comprise a fully-oxidized asphalt having a softening point of between about 110° F. and about 160° F. and a slurry, the slurry comprising water, a colloidal clay (preferably bentonite clay), barium chloride, and citric acid. Optionally sodium dichromate, fillers such as cellulose fibers, and biocidal agents are added as well. The method for making such asphalts comprises oxidation of a flux asphalt in an air still, preparation of the slurry, and combination of the oxidized asphalt and the slurry in a high speed mixing machine such as a colloidal mill.

18 Claims, 2 Drawing Sheets

OXIDIZED ASPHALT EMULSIONS

TECHNICAL FIELD

The invention relates to asphalt-based roofing, waterproofing, and sealing compounds, in particular to aqueous emulsions of asphalt.

BACKGROUND OF THE INVENTION

For centuries asphalt and other bituminous products have been used to provide waterproofing and protective coverings and coatings for roofs, foundations, and the like; resilient, weather resistant pavings; and sealants useful in a wide variety of applications. Long ago it was found that the undesirably low melting or softening points of natural asphalts could be raised through the addition of oxygen, and that that advantage and others offered by oxidized asphalt could be extended through the use of rubber or other polymer modifiers. Raising the softening point of an asphalt improves its performance in applications subject to moderately warm or hot temperatures, such as for example roofing—on a typical sunny summer day, for example, the temperature of a black asphalt roof may easily reach temperatures in excess of 125° F. As the softening point of a straight unoxidized asphalt (that is, an asphalt taken straight from the petroleum refining process or from a natural bitumen deposit) is typically about 70° F., such temperatures can cause sagging or running in the asphalt, resulting in a loss fluid-tight or sealing integrity of the roof and a diminishment or complete abrogation of its value as a sealing barrier.

Oxidized or "air blown" asphalts, however, have not been useable in many applications. For example, among the most important classes of asphalt products are emulsified coatings, sealants, adhesives, and mastics capable of being applied at typical ambient temperatures (between about 35° F. and about 120° F.). Such emulsions are used both for the construction of primary sealing and waterproofing membranes and for patching and repair of existing membranes. But it has proven particularly difficult to reliably and economically emulsify oxidized asphalts for use as coatings, sealants, adhesives, and mastics applied at ambient temperatures. Emulsified asphalts are typically made by processing non-oxidized straight run or "flux" asphalts in high shear milling machines with slurries comprising water and soaps such as bentonite clays or other chemical catalysts. When this is tried with oxidized asphalts (such as for example any ASTM D312 oxidized asphalts) the emulsion process fails: the asphalt and slurry fail to combine. Typically the asphalt is so viscous, due to its elevated softening point, that the milling machine is incapable of maintaining operational RPMs and bogs down. Thus despite the clear superiority of oxidized asphalts in almost all applications, including emulsions, it has not been possible to produce oxidized asphalt emulsion products. The same is true with respect to oxidized asphalts modified by the addition of rubber and other polymers, which are known to possess superior weather-resistance, resistance to ultraviolet (UV) rays and ozone, resistance to thermal shock cycles (i.e. thermal stress cycles induced by, for example, daily exposure to cycles of warm sun and cool darkness), and durability under impacts, etc.

Typical of the machinery used for making non-oxidized asphaltic emulsions until the advent of the invention disclosed herein is the prior art mill shown schematically in FIG. 1. Prior art mill 1 comprises rotor 12 with blades 13 housed in a mixing chamber formed by the inner surface of casing 14. Non-oxidized asphalt is fed into the mixing chamber through line 10 and blended with slurry fed through line 11. After mixing, emulsified product is removed via line 17. A typical mill comprises two or more rows of blades 13, which are often made of simple blunt cylindrical objects such as bolts. Typical geometry provides a rotor radius 15 of approximately 7 to 8 inches and a grinding gap or minimum clearance of two or more inches. With a rotor speed of 1200 RPM and a rotor power input of approximately 10 horsepower, such a mill can produce about 90 to about 120 gallons per minute of non-oxidized asphaltic emulsion. When the use of oxidized asphalt was attempted, machines of this type bogged down and failed to properly emulsify the asphalt.

Many attempts have been made to improve the various characteristics of emulsified asphalts, but none have addressed the problem of making them with oxidized asphalt bases. For example, U.S. Pat. Nos. 5,558,702, 5,667,577, and 5,667,576 to Chatterjee et al.; 5,711,796 to Grzybowski et al.; and 4,822,247 4,985,079 to Graf et al. describe various improvements in asphaltic emulsions. But none teaches or suggests a method of providing such emulsions with the advantages of the elevated softening point of an oxidized asphalt base, or of doing so with the added benefits offered by modification of the base asphalt by rubber or other polymers. The Gryzbowski reference discusses oxidization products of naturally occurring asphalts from the Orinoco belt of Venezuela, made partially with the use of water, but the water is ultimately removed from the product and is introduced solely for the purpose of aiding oxidation of the particular asphalts described. The oxidation of straight or flux asphalt is, in general, a relatively well-understood problem; the problem arises upon attempting to emulsify such asphalts.

Thus there exists a need for an asphaltic emulsion that is suitable for use as a roofing, waterproofing, and sealing compound and which enjoys the benefits of a fully oxidized asphalt base. There is also a need for an effective, efficient, economical method for making such an emulsion. There is a further need for such emulsions made with rubber or other polymer-modified asphalt bases, and for methods for making such modified emulsions.

DISCLOSURE OF THE INVENTION

Accordingly, it is an object of the invention to provide an asphaltic emulsion that is suitable for use as a roofing, waterproofing, and sealing compound and which enjoys the benefits of a fully oxidized asphalt base. It is a further object of the invention to provide an effective, efficient, economical method for making such an emulsion. It is yet another object of the invention to provide such emulsions made with rubber or other polymer-modified asphalt bases, and for methods for making such modified emulsions.

These and such other objects of the invention as will become evident from the disclosure below are met by the invention. The invention provides product and method for making an asphaltic emulsion enjoying the weather-resistant and durability advantages of a fully-oxidized asphaltic base. Preferred compositions according to the invention comprise a fully-oxidized asphalt having a softening point of between about 110° F. and about 160° F. and a slurry, the slurry comprising water, bentonite clay, barium chloride, and citric acid. Optionally sodium dichromate, fillers such as cellulose fibers, and biocidal agents are added as well. The method for making such asphalts comprises oxidation of a flux asphalt in an air still, preparation of the slurry, and combination of the oxidized asphalt and the slurry in a high speed mixing machine such as a colloidal mill.

In one aspect the invention provides a fully-oxidized asphaltic emulsion comprising about 40 to about 50 parts by weight oxidized asphalt having a softening point of between about 110° F. and about 160° F., and preferably about 135° F., and about 50 to about 60 parts by weight slurry. The slurry comprises water, a colloidal clay, barium chloride, and citric acid. Particularly preferred embodiments of the invention, as detailed below, comprise about 44% by weight asphalt and about 56% by weight slurry.

The asphalt comprised by the emulsive composition serves as a major component in building the waterproofing, sealing, and protective coating of the invention. Any asphalt capable of being oxidized to a softening point in the specified range and consistent with the purposes stated herein will serve. For most applications, oxidized asphalts having a softening point of about 100° F. or more are adequate, but best results have been achieved by oxidizing the asphalt to a softening point of between about 110° F. and about 160° F., and particularly about 135° F., and these asphalts are preferred for use with the invention. As mentioned, a particularly advantageous feature of the compositions and processes described herein is that they are fully compatible with the use of rubber or other polymer-modified asphalt bases, including in particular asphalts modified by the addition of styrene-ethylene-butylene-styrene (SEBS) block copolymer, styrene-butadiene-styrene (SBS) block copolymer, and atactic polypropylene (APP), and that emulsions made with such asphalts enjoy each of the advantages typically associated with the presence of the modifiers. As more fully explained in my patent applications Ser. No. 08/978,243, filed Nov. 25, 1997, and entitled "Styrene Ethylene Butylene Styrene (SEBS) Copolymer Rubber Modified Asphalt Mixture"; and Ser. No. 08/978,244, filed Nov. 25, 1997, and entitled "Plasticized Styrene Ethylene Butylene Styrene (SEBS) Copolymer Rubber Modified Asphalt Mixture," modified asphalts enjoy all of the advantages offered by unmodified asphalts, and many more, including increased resistance to thermal stresses, ozone, and ultraviolet radiation. Moreover, asphaltic emulsions according to the invention described herein may be produced by the methods and apparatus described herein in the same manner those containing non-modified asphalts, without need for modifying the process or apparatus. The specifications for my SEBS modified asphalts are hereby incorporated in this specification, as if set out fully herein, to supplement the processes and explanations provided herein, and to support my teaching of the art of making polyester sheets coated with specially modified asphalts. It is preferred to use modified base asphalts comprising from 1% to about 25% by weight styrene ethylene butylene styrene (SEBS) copolymer, and in particular between about 4% to about 6% SEBS, before mixing with slurry and addition of fillers and other additives.

Water serves as the dispersion medium and the major component of the slurry for the emulsion, providing a vehicle for the asphalt to be applied to a substrate at ambient temperatures. Following application of the asphaltic emulsion to a substrate to be protected or sealed by the emulsion, the water evaporates, leaving behind a membrane comprised of asphalt and any other non-volatile materials present in the emulsion. Any water of adequate purity to serve the purposes described herein will serve. Preferred slurries for use in making compositions according to the invention comprise between about 90% and about 95% by weight water, and in particular about 92% weight by water, prior to addition of the slurry to the asphalt base.

The colloidal clay serves as an emulsifier (sometimes also referred to in the industry as a "dispersant") by coating individual asphalt particles during the emulsification process and permitting them to be suspended within the water vehicle. Any colloidal clay suitable for such purpose will serve. A preferred colloidal clay for use with the invention is bentonite clay, which is sometimes also known as wilkenite. Typical colloidal clays comprise substantial amounts of aluminum silicates, and usually some magnesium and iron as well. One example of a suitable emulsifier for use with the invention is Volclay SPV2000, available through the American Colloid company. Preferred slurries for use in making compositions according to the invention comprise between about 4% and about 10% by weight bentonite clay, and in particular about 7% by weight prior to addition of the slurry to the asphalt. The addition of too little colloidal clay prevents proper emulsification of the asphalt and results in an inferior or unusable product, while the use of too much colloidal clay results in a compound having excess clay in suspension, which results, when used, in a brittle membrane prone to untimely breakdown and failure as a waterproofing or sealing membrane.

Barium chloride ($BaCl_2.2H_2O$) is used as an emulsifying agent to aid the colloidal clay in acting as an emulsifier to coat the asphalt. Preferred slurries for use in making compositions according to the invention comprise between about 0.1% and about 1.0% by weight barium chloride, and in particular about 0.4% by weight prior to addition of the slurry to the asphalt. The use of barium chloride in the manner described results in a smother emulsion of more consistent character, with superior spreading and coating qualities. Commercially pure barium chloride is available through Van Waters & Rogers, Inc., of Amarillo, Tex.

Citric acid (2-hydroxy-1,2,3-propane-tricarboxylic acid; $HOOCCH_2C$ (OH) (COOH) $CH_2COOH.H_2O$) is used as a sequestering agent and to control the acidity of the slurry and therefore of the finished composition. It is preferred that the slurry be moderately acidic prior to its addition to the asphalt; thus it is preferred to use enough citric acid to bring the slurry to a pH of between about 4.0 and about 6.0, and preferably in the range about 4.7 to 5.0, prior to combination of the slurry with the asphalt. In a slurry consisting of 15,900 parts water, 1,300 parts bentonite clay, and 70 parts barium chloride, it has been found that the addition of 5.25–6.25 parts, and typically 5.75 parts, citric acid will accomplish the desired result, both as a sequestering agent in preventing unwanted reactions and in bringing the pH of the slurry to the range of about 4.7 to about 5.0. The use of either too much or too little citric acid or other pH balancer (i.e. attempting to produce the emulsion under either too acidic or too basic conditions) results in a breaking of the emulsion. This has been observed to result in an inconsistent mixture having greyish strings of asphalt and other ingredients and having poor application characteristics which produce an inferior waterproofing or sealing membrane. Commercially pure anhydrous citric acid may be obtained through Van Waters & Rogers, Inc., of Kent, Wash.

It has been found to be further beneficial to add various other optional additives to the asphaltic emulsions of the invention, and in particular to the slurry prior to combination of the asphalt and slurry.

One such optional ingredient is sodium dichromate (also called sodium bichromate, $Na_2Cr_2O_7.H_2O$). Sodium dichromate is used in asphaltic emulsions according to the invention as a rust and corrosion inhibitor, especially where it is expected that the emulsions are to be stored in metal containers. It has been found that the addition of 0.01 to about 0.05% percent by weight sodium dichromate to the slurry, prior to combination of the slurry and the asphalt, serves quite satisfactorily in prohibiting corrosion in both storage containers and in the substrate when the asphalt has been applied. Preferred slurries according to the invention comprise about 0.03% by weight sodium bichromate prior to combination with asphalt. For example, in a slurry consisting of 15,900 parts water, 1,300 parts bentonite clay, 70 parts barium chloride, 4.5 parts sodium dichromate, and 5.75 parts citric acid, the addition of about 4.5 pounds sodium dichromate will produce the desired results.

It is also advantageous in many conditions to add various fillers to the asphaltic emulsions of the invention. Such fillers may include those selected from the group comprising cellulose fibers, diatomaceous earth, limestone, and asbestos. In addition to other properties contributed by specific fillers, fillers in general can, as will be understood by those having an ordinary familiarity with the art, be used to control or affect the viscosity, bulk, and solids content of the finished cutback product, as well as fire ratings, thermal insulation characteristics, creep (or sag), and weather resistance. Cellulose, limestone, and diatomaceous earth are also especially useful for absorbing excess oils present in the asphalt. Many of these fillers, and especially limestone, are cost effective fillers, in that they are relatively inexpensive. An example of a cellulose filler suitable for use in accomplishing the purposes disclosed herein is available under the trade designations GEL-CEL, INTERFIBE 230, and INTERFIBE 250 from Interfibe of Portage, Mich. Such fibers are available in various average lengths. It is found that the use of a mix of relatively short and relatively long fibers is desirable in tailoring characteristics in the finished cutbacks. The possibilities and appropriate lengths or mixes of lengths for achieving desired characteristics will not trouble one of ordinary skill in the art of making asphalt coatings. A particularly efficacious means for adding cellulose fibers to the compound during mixing has been found to be to load the fibers into a common insulation blower, such as those used in the residential and commercial insulation industries, and to blow it into the mixing tank. This has been found to aid uniform mixing of the fibers and making a more consistent product. Optionally, it has been found to be economical and effective to add the cellulose fibers to the emulsion after the asphalt and slurry have been combined by passing the emulsion and the cellulose fibers through a ribbon mixer. Preferred emulsions according to the invention comprise, when cellulose fibers are added, approximately 0.2% to about 3% cellulose by weight, after combination of the asphalt, slurry, and cellulose. In particular, excellent results have been achieved by adding about ½% by weight cellulose.

It has also been found to be advantageous in some circumstances to add biocidal agents to asphaltic emulsions according to the invention, particularly in emulsions comprising rubber or other polymer-modified asphalt bases. It has been found that bacteria and other microscopic organisms can exist and multiply in such compositions, but that they are defeated by the addition of biocidal agents. Many types of biocides will serve this purpose adequately for the compositions disclosed herein, especially those used conventionally in the preservation of water based emulsions, latex paints and coatings, and the like. An example of a particularly preferred biocide is that registered in the Chemical Abstracts Registry as 1,3,5-triazine-(2H,4H,6H)-triethanol, under registration number 4719-04-4 and available under the trade designation Troysan 174 or Triadine 174 through the Olin Corporation. Preferred embodiments of rubber or other polymer-modified asphaltic emulsions according to the invention comprise between about 0.8% and 0.18% by weight, and most preferably about 0.13% by weight, 1,3,5-triazine-(2H,4H,6H)-triethanol biocide following combination of the asphalt and slurry.

In another aspect the invention provides a method of making a fully oxidized asphaltic emulsion. The method comprises the steps of oxidizing a flux asphalt to a softening point of between about 110° F. and about 160° F., and preferably about 135° F., by blowing atmospheric air through the asphalt in an air still, heating the oxidized asphalt to a temperature of between about 150° F. and about 350° F., and preferably about 275° F.; preparing a water slurry by heating water to between about 100° F. and about 140° F., blending about 90 to about 95 parts by weight water with about 4 to about 10 parts by weight colloidal clay, and with enough citric acid to give the slurry a pH of between about 4.7 and about 5.0; and mixing the oxidized asphalt with the slurry at the aforementioned temperatures and in proportions of about 40 to about 50 parts by weight asphalt to about 50 to about 60 parts by weight slurry in a colloidal mill comprising a mixing stage having a stator and a rotor. In preferred processes according to the invention, the stator and rotor of the colloidal mill are disposed such that the minimum clearance between the stator and rotor is maintained at between about 0.001 inch and about 0.125 inch, preferably at about 0.060 inch, and the rotor is set to rotate at a speed of at least about 3000 RPM, most preferably at about 3600 RPM.

As with the previously-described composition aspect of the invention, it is preferred that the colloidal clay comprise bentonite clay. Options include addition of about 0.4 parts by weight barium chloride with the slurry prior to mixing of the slurry with the oxidized asphalt, addition of about 0.03 parts by weight sodium dichromate with the slurry prior to mixing of the slurry with the oxidized asphalt, and addition to the emulsion of a biocidal agent and fillers such as cellulose fibers.

BEST MODE OF CARRYING OUT THE INVENTION

Figure 3:
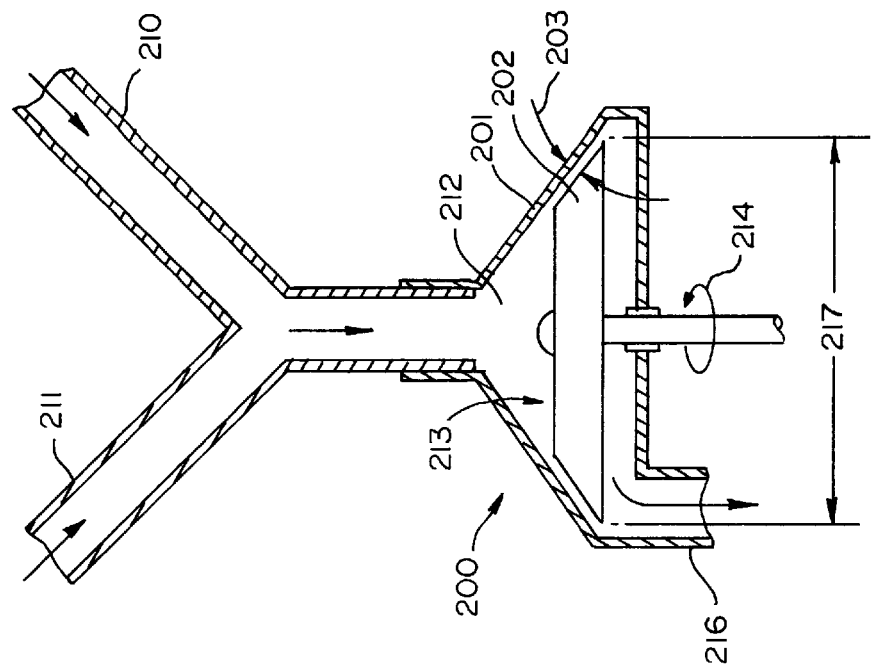
FIG. 3 is a schematic side view of a preferred embodiment of a mill for use in making asphaltic emulsions according to the invention.

Turning now to the drawings, the invention will be described in a preferred embodiment by reference to the numerals of the drawing figures wherein like numbers indicate like parts.

Figure 2:
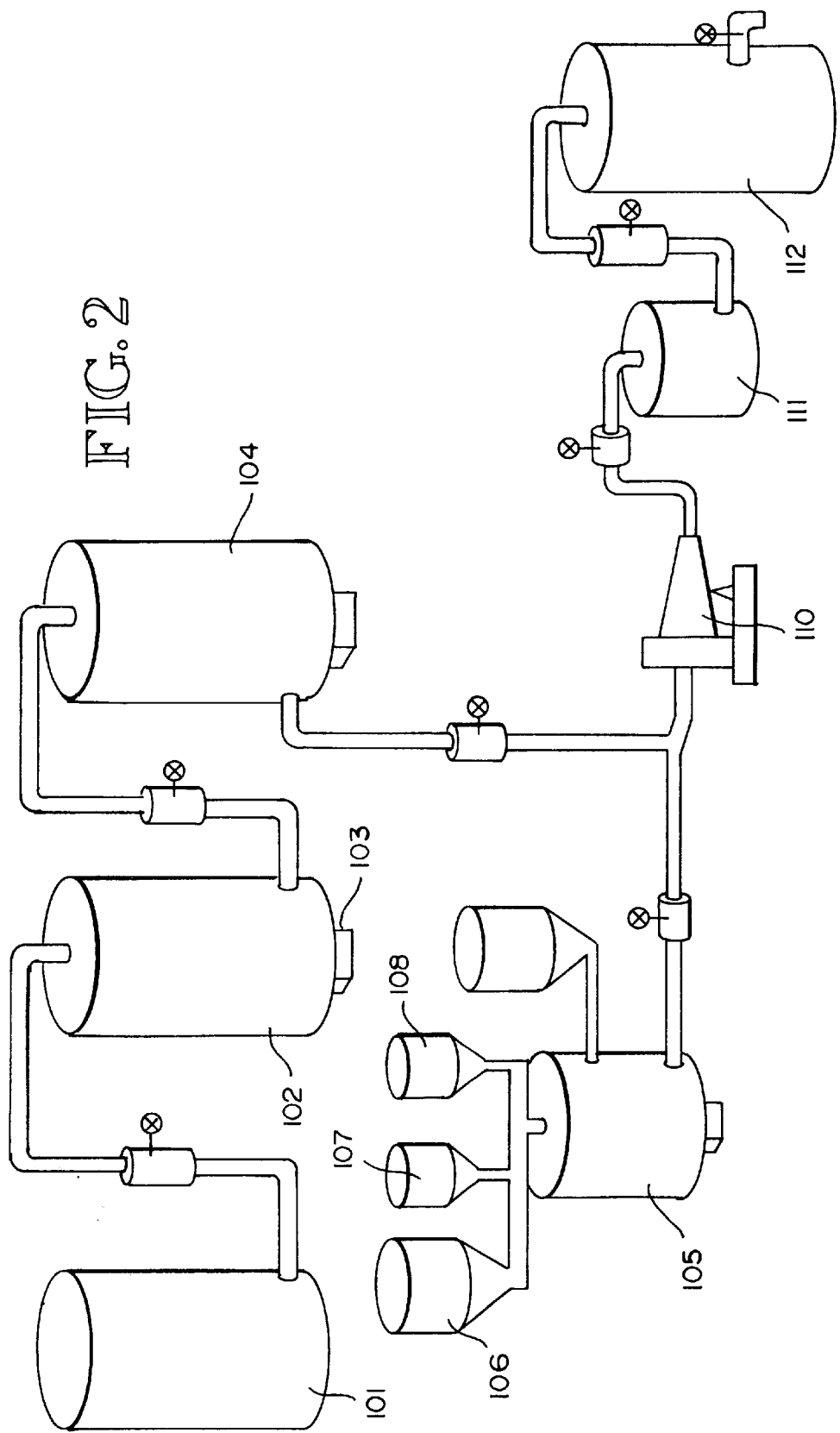
FIG. 2 is a schematic view of an apparatus for practicing a preferred method of making asphaltic emulsions according to the invention.

FIG. 2 is a schematic view of an apparatus for practicing a preferred method of making asphaltic emulsions according to the invention. Flux asphalt is moved from storage tank 101 to air still 102 at a temperature of between about 375° F. and about 425° F., and most preferably about 400° F., where by means of blower 103 ambient atmospheric air is blown through the asphalt, starting an exothermic reaction whereby the asphalt is oxidized. When conventional heating and cooling tests according to ASTM standards confirm that the asphalt has been oxidized to the extent that it has a softening point of between about 110° F. and about 160° F., and preferably about 135° F., it is transferred to storage tank 104, where it is maintained, by means of heaters if necessary, at a temperature of between about 150° F. and about 350° F. A water slurry is prepared in mixing tank 105 by heating water to between about 100° F. and about 140° F., and preferably about 120° F., and blending about 90 to about 95 parts by weight water with about 4 to about 10 parts by weight colloidal clay, preferably bentonite clay, from bin or hopper 106; and with enough citric acid to give the slurry a pH of between about 4.7 and about 5.0. The oxidized asphalt and the water slurry are then moved to colloid mill 110, where they are mixed in proportions of about 40 to about 50 parts by weight asphalt to about 50 to about 60 parts by weight slurry. Optionally, about 0.4 parts by weight barium chloride from tank or bin 108 is added to the slurry in mixing tank 105, along with about 0.03 parts by weight sodium dichromate. Further optional additions comprise biocidal agents and fillers such as cellulose fibers from tank or bin 109. The addition of biocidal agents and cellose fiber to aqueous asphaltic emulsions are well known; the selection of suitable proportions for applications other than those described in the Examples below will not trouble those having any ordinary skill in the art of making such emulsions, depending upon the uses to which the asphalt is to be put.

The asphalt and slurry are then fed to colloid mill 100, which grinds the asphalt particles to a size of about 5 to about 20 microns and facilitates coating of the asphalt with colloidal clay deposits and suspension of the coated particles in the slurry. The resultant asphaltic emulsion is then transferred to optional mixing tank 111, where additional fillers, biocidal agents, and the like may be added, and then to storage tank 112, from which the emulsion may be packed in cans or barrels for shipment and handling, or transferred to tanks for bulk transfer.

Figure 1:
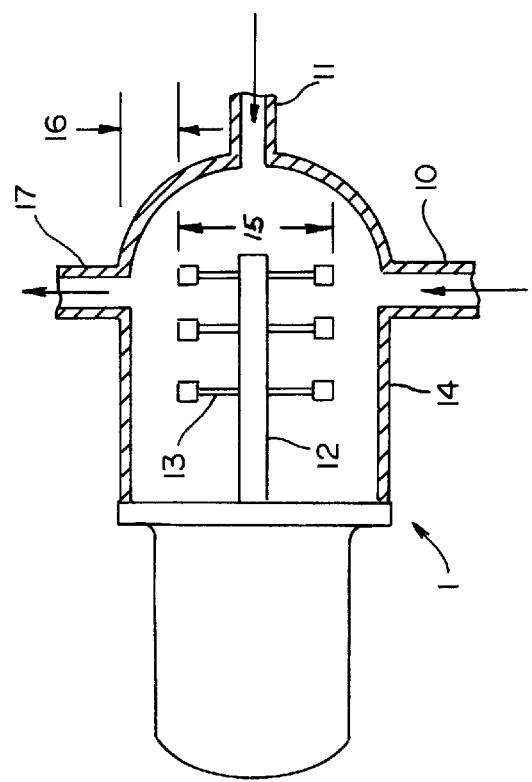
FIG. 1 is a schematic partial cut-away view of a prior art mill for making asphaltic emulsions.

As previously mentioned, a great many advantages may be realized through the addition of various natural and synthetic rubbers and other polymers to the asphalt before it is blended with the slurry. In the preferred apparatus shown in FIG. 1, this is accomplished by adding from 1% to about 25% by weight styrene ethylene butylene styrene (SEBS) copolymer, and in particular between about 4% to about 6% SEBS, to the oxidized asphalt in optional tank 104 before mixing the asphalt with the slurry and before the addition of any fillers or other additives. Suitable methods for combining SEBS modifiers with oxidized asphalts are described in the incorporated patent applications Ser. No. 08/978,243, filed Nov. 25, 1997, and entitled "Styrene Ethylene Butylene Styrene (SEBS) Copolymer Rubber Modified Asphalt Mixture"; and No. 08/978,244, filed Nov. 25, 1997, and entitled "Plasticized Styrene Ethylene Butylene Styrene (SEBS) Copolymer Rubber Modified Asphalt Mixture."

The air stills, storage tanks, mixing tanks, blowers, pumps and mixers and the like used in the process disclosed herein are of conventional design and layout, with the exception of the mill used in combining the asphalt and slurry. As previously indicated, mills conventionally used in the preparation of asphaltic emulsions provide unsatisfactory results when oxidized asphalts are used. Such mills tend to bog down due to the increased viscosity and elevated softening point of the oxidized asphalt, and to produce incomplete emulsions characterized by streaky, lumpy compositions of inconsistent color and smoothness.

A preferred mill for use with in making asphaltic emulsions according to the invention is shown schematically in FIG. 2. Colloid mill 200 comprises stator 201 and rotor 202, which are separated by minimum clearance distance or grinding gap 203. Oxidized asphalt and slurry are fed to the mill in the prescribed ratios through lines 210 and 211 and passed to chamber 212. As the asphalt and slurry contact the rotor, which is rotating at high speed in the direction of arrow 214, they are forced to lower edge region 213 by centrifugal force. Centrifugal force urges the material through gap 203 between the rotor and stator, wherein particles of the materials are subjected to great shearing forces which counteract the surface forces tending to hold the particles together, thus facilitate coating of individual asphalt particles by slurry materials, including notably the colloidal clay, and suspending the particles in the slurry to form an emulsion. The resulting asphaltic emulsion is then removed from chamber 212 via line 216 and passed to storage or packing apparatus. Using the configuration shown, with a rotor diameter 217 of between about 6 and about 18 inches, a rotor rotational rate of between about 3000 and about 4000 RPM and preferably about 3600 RPM, a clearance distance or grinding gap 203 of between about 0.04 and about 0.08 and preferably about 0.06 inches, a power input of between about 50 and 150 horsepower to the rotor, and a combined flow rate of asphalt plus slurry of between about 25 and 30 gallons per minute, an average particle size of between 5 and 20 microns results, giving a very satisfactory grade fully oxidized asphaltic emulsion. It is believed that the primary factor in the success of such mills in making the emulsion is the combination of the stator and the rotor shearing the asphalt and the slurry in a gap of the stated clearance at the stated rates. Suitable mills are available commercially from several manufacturers, for example a Charlotte Model G-125 colloid mill available through Chemicolloid Laboratories, Inc., of Garden City Park, N.Y., or from the Premier Mill Corp. of New York City.

EXAMPLE 1

A fully-oxidized asphaltic emulsion is produced using the apparatus and methods described above. Approximately 25,000 gallons of TOSCO brand flux asphalt is oxidized to a softening point of 135° F. by placing it in a 30,000 gallon capacity air still and blowing air through the asphalt at a rate of 5,500 cubic feet per minute for approximately three hours. Care is exercised during the endothermic oxidation process to prevent the temperature of the asphalt from exceeding about 450° F. When it has been established through testing according to the standards of ASTM D36 that a 135° F. softening point has been attained, 140,000 pounds of the asphalt are pumped to a 30,000 gallon capacity vertical storage tank allowed to cool to approximately 275 to 300° F. In a separate 2,000 gallon mixing tank 1,900 gallons of water at a temperature of 120° F. is mixed with 1,300 pounds of bentonite clay by means of a 20 horsepower Burhans-Sharpe Reliance model blade mixer having an 18-inch diameter mixing propeller. When the water-clay mixture is uniformly blended, 70 pounds of barium chloride are added and allowed to blend uniformly; when this mixture is uniform 4.5 pounds of sodium dichromate and 5.75 pounds of citric acid are added. The mixture is checked visibly for smooth incorporation of the clay and uniform distribution of added chemicals, and manually for a smooth texture. The pH is tested for a value between 4.7 and 5.0 and corrected, if necessary, by the addition of citric acid. Both the oxidized asphalt and the clay slurry are then fed to a colloid mill having a stator and rotor comprising a grinding gap of 0.060 inch, with the rotor rotating at 3600 RPM. The asphalt is fed to the mill at a rate of 27.5 gallons per minute, and slurry at a rate sufficient to provide a mixture of 44% asphalt and 56% slurry by weight. The resultant emulsified product is transferred to a 6,700 gallon capacity ribbon mixer for further agitation while the emulsion cools to between 180° F. and 200° F., at which point it is transferred to a holding tank.

Approximately 57,000 gallons of fully oxidized asphalt emulsion, produced in 6,000 gallon batches, results. The emulsion is packed in 1 gallon, 3 gallon and 5 gallon cans, 11 ounce tubes, and truck tanks for use. It may be used for general membrane patching, sealing, roofing, and waterproofing.

EXAMPLE 2

A fully-oxidized asphaltic emulsion comprising cellulose filler is produced using the apparatus and methods described above. 57,000 gallons of fully oxidized asphaltic emulsion is prepared as according to Example 1. After the emulsion has been transferred to the ribbon mixer, ½% by weight Interfibe 230 is added. The asphaltic emulsion is further processed and packaged as in Example 1.

EXAMPLE 3

A fully oxidized SEBS-modified asphaltic emulsion is prepared using the apparatus and methods described above. After the flux asphalt has been oxidized to a 135° F. softening point as described above, 21,000 pounds of plasticized SEBS in the form of I-175 gelled bricks produced by Imperbel America Corporation of 717 South 38th, P.O. Box 6761, Kansas City, Kans., are placed in a 30,000 gallon side-entry mixing tank. The oxidized asphalt is added, the resultant mix being blended by conventional low shear mixing equipment as described in the incorporated applications. Gelled bricks of I-175 contain approximately 62% by weight (63.5% by volume) SEBS block copolymer, approximately 33% by weight or volume napthenic oil, approximately 3% by weight or volume dioctyl phthalate, and approximately 1% or less carbon black and minor amounts of miscellaneous extractables, as for example waxes or other processing aids. The SEBS modified oxidized asphalt is blended until a uniform distribution is achieved. This results in a modified asphalt comprising 5.6% by weight SEBS block copolymer. The modified asphalt is emulsified with clay slurry as per Example 1. After emulsification the resultant product is transferred in 3,700 gallon batches to the ribbon mixer, where 5 gallons of Troysan 174 biocide is thoroughly mixed with the emulsion. The resultant emulsion is further processed and packaged as in Example 1.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability in the roofing, waterproofing, and sealing industries. In particular, the invention represents an advance in the usefulness, effectiveness, ease of installation, durability, weather resistance, and resistance to ultraviolet rays and ozone of asphaltic emulsions, and in the production of such emulsions.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A fully oxidized asphaltic emulsion, the emulsion comprising:

about 44 parts by weight oxidized asphalt having a softening point of between about 110° F. and about 160° F.; and about 56 parts by weight slurry, the slurry comprising about 92% by weight water, about 7% by weight bentonite clay, about 0.4% by weight barium chloride, and enough citric acid to bring the slurry to a pH of between about 4.0 and about 6.0 prior to combination of the slurry with the asphalt.

2. The asphaltic emulsion of claim 1, further comprising about 0.03% by weight sodium dichromate.

3. The asphaltic emulsion of claim 1, wherein said oxidized asphalt comprises between about 1% and about 25% by weight styrene ethylene butylene styrene copolymer before the asphalt is mixed with said slurry.

4. The asphaltic emulsion of claim 1, further comprising a cellulose fiber filler.

5. The asphaltic emulsion of claim 1, further comprising a biocidal additive.

6. A method of making a fully oxidized asphaltic emulsion, the method comprising the steps of:

oxidizing a flux asphalt to a softening point of between about 110° F. and about 160° F.;

heating said oxidized asphalt to a temperature of between about 150° F. and about 350° F.;

preparing a water slurry by heating water to between about 100° F. and about 140° F., blending about 90 to about 95 parts by weight of said water with about 4 to about 10 parts by weight colloidal clay, and with enough citric acid to give the slurry a pH of between about 4.7 and about 5.0;

mixing said oxidized asphalt with said slurry at said temperatures and in proportions of about 40 to about 50 parts by weight asphalt to about 50 to about 60 parts by weight slurry in a colloidal mill comprising a mixing stage having a stator and a rotor, said stator and rotor disposed such that a minimum clearance between the stator and rotor is between about 0.04 inch and about 0.08 inch, and said rotor adapted to rotate at a speed of at least about 3000 RPM.

7. The method of claim 6, wherein said colloidal clay comprises bentonite clay.

8. The method of claim 6, further comprising the step of blending about 0.4 parts by weight barium chloride with the slurry prior to mixing of said slurry with said oxidized asphalt.

9. The method of claim 6, further comprising the step of blending about 0.03 parts by weight sodium dichromate with the slurry prior to mixing of said slurry with said oxidized asphalt.

10. The method of claim 6, further comprising the step of blending a biocidal agent with the asphaltic emulsion.

11. The method of claim 6, comprising the further step of adding between about 1% and about 25% by weight styrene ethylene butylene styrene copolymer to said oxidized asphalt prior to mixing the asphalt with said slurry.

12. The method of claim 6, further comprising the step of blending cellulose fiber filler with the asphaltic emulsion.

13. A fully oxidized asphaltic emulsion, the emulsion comprising:
   about 40 to about 50 parts by weight oxidized asphalt having a softening point of between about 110° F. and about 160° F.; and
   about 50 to about 60 parts by weight slurry, the slurry comprising about 90% to about 95% by weight water, about 4% to about 10% by weight colloidal clay, at least about 0.1% by weight barium chloride, and enough citric acid to bring the slurry to a pH of between about 4.0 and about 6.0 prior to combination of the slurry with the asphalt.

14. The asphaltic emulsion of claim 13, wherein said colloidal clay comprises bentonite clay.

15. The asphaltic emulsion of claim 13, further comprising at least about 0.01% by weight sodium dichromate.

16. The asphaltic emulsion of claim 13, wherein said oxidized asphalt comprises between about 1% and about 25% by weight styrene ethylene butylene styrene copolymer before the asphalt is mixed with said slurry.

17. The asphaltic emulsion of claim 13, further comprising a cellulose fiber filler.

18. The asphaltic emulsion of claim 13, further comprising a biocidal additive.

\* \* \* \* \*